Jan. 1, 1952   N. B. SMITH   2,580,472
WORK MANIPULATING MECHANISM
Original Filed Aug. 8, 1941   2 SHEETS—SHEET 1
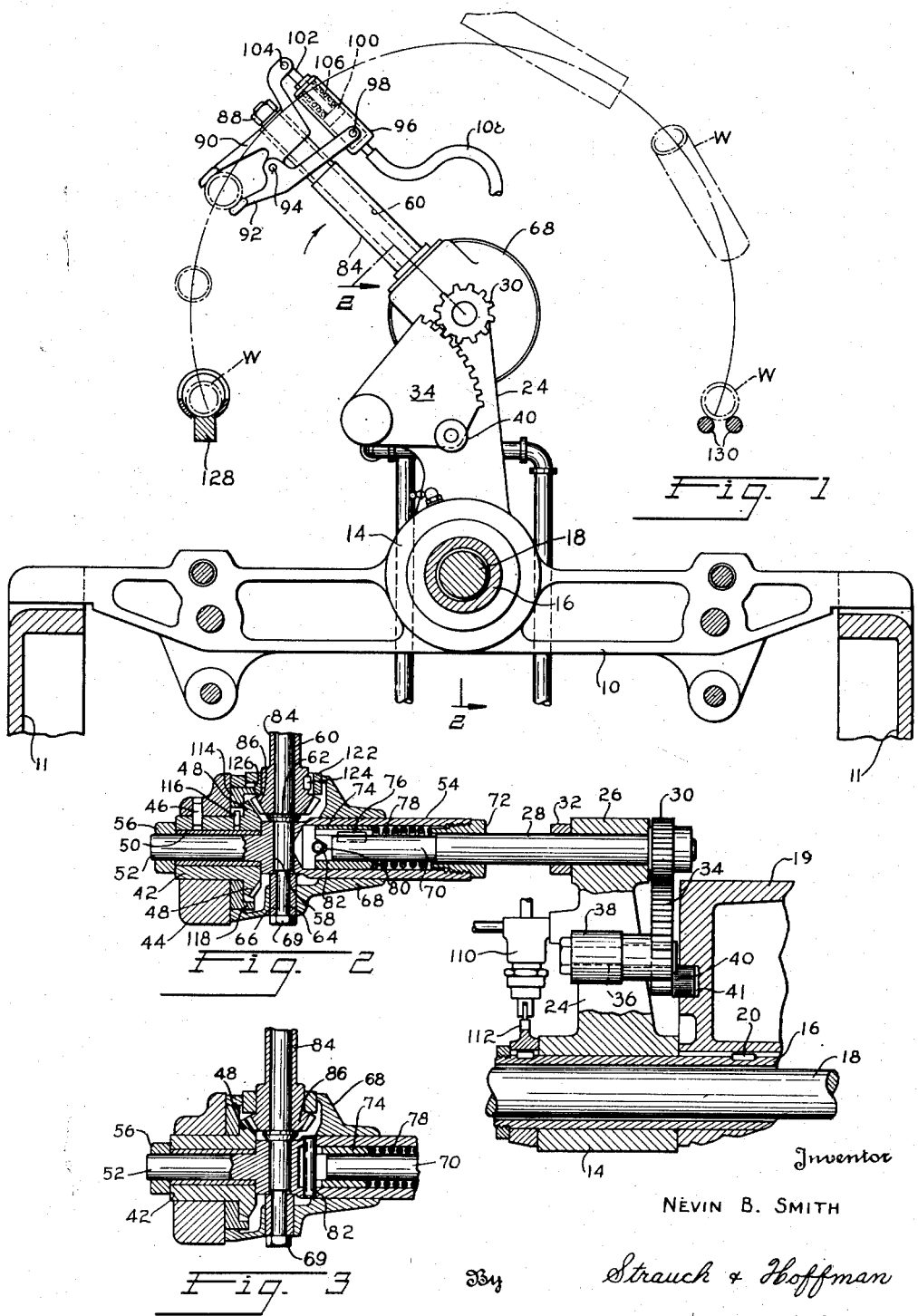
Inventor
NEVIN B. SMITH
By Strauck & Hoffman
Attorneys Jan. 1, 1952 N. B. SMITH 2,580,472
WORK MANIPULATING MECHANISM
Original Filed Aug. 8, 1941 2 SHEETS—SHEET 2
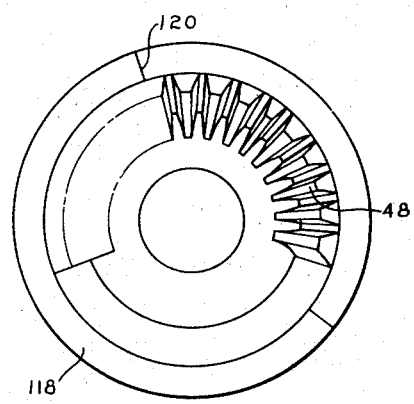
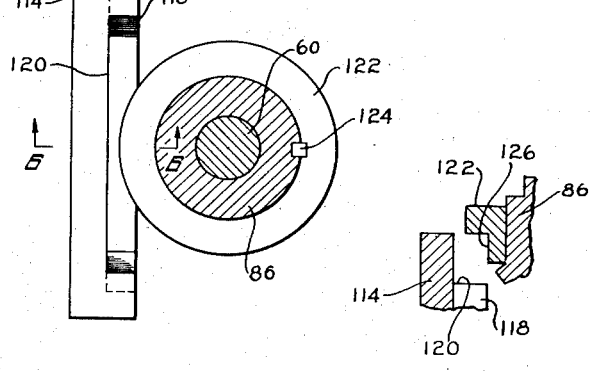
Inventor
NEVIN B. SMITH
By Strauch & Hoffman
Attorneys Patented Jan. 1, 1952

2,580,472

UNITED STATES PATENT OFFICE 2,580,472

WORK MANIPULATING MECHANISM

Nevin B. Smith, Hamburg, Pa., assignor to Landis Machine Company, Waynesboro, Pa., a corporation of Pennsylvania Original application August 8, 1941, Serial No. 406,049, now Patent No. 2,360,906, dated October 24, 1944. Divided and this application October 21, 1944, Serial No. 559,799

6 Claims. (Cl. 214—1)

This invention relates to work manipulating mechanism, the subject matter of the present application constituting a division of my pending application for patent on Automatic Metal Working Machine, Serial No. 406,049, filed August 8, 1941, now Patent No. 2,360,906, October 24, 1944.

While the invention to be presently described is of more or less general application in the industrial arts for the purpose of manipulating a work piece in the process of manufacture into the finished article, it is particularly designed for the purpose of reversibly positioning nipples and like articles to be threaded or otherwise operated upon with relation to spaced threading or work-performing machines, as fully described in my pending application.

It is accordingly an important object of the invention in one embodiment thereof to provide an efficiently functioning mechanism of this kind, operable in timed relation with the operation of the work-performing machine, for transferring a work piece from a work support after one end thereof has been operated on by one machine to a work support associated with the other machine, and, during such transfer, to reverse the work piece end for end, so that its other end will then be in a position for operation thereon by the latter machine.

Another object of the invention is to provide a work manipulating mechanism embodying work carrying means movable in angularly related paths together with a power driven shaft and a support for the work carrying means connected to said shaft and movable thereby with the work carrying means in one of said paths, and means directly responsive to movement of the work carrying means in said one path to simultaneously move said work carrying means through the other of said paths.

It is a further object of the invention to provide a support for the work carrier together with means for imparting rotative movement to the work carrier with and relative to the support, simultaneously in each of two angularly related paths.

A further object of my invention resides in the provision of means for controlling the rotative movement of the work carrier relative to the support in timed relation to the unitary rotative movement of the work carrier with the support.

Still another object of my invention is to provide a single power driven shaft to which the work carrier support is rigidly fixed and means operatively controlled by said shaft for rotating the work carrier on the support during a portion of the bodily rotative movement of said support and carrier with the power driven shaft, together with means for releasably holding or restraining the work carrier against rotation on the support when said carrier rotating means is functionally inactive.

It is also the general aim and purpose of my present invention to provide a work manipulating mechanism as above characterized in which a minimum number of mechanical parts of simple and rugged structural form are employed and assembled in a compact organization for highly efficient and reliable functional operation.

With the above and other objects in view, the invention comprises the improved work manipulating mechanism, as well as the construction and relative arrangement of its several cooperating parts, as will hereinafter be more fully described, illustrated in the accompanying drawings and subsequently incorporated in the subjoined claims.

In the drawings wherein I have shown one simple and practical embodiment of the invention, and in which similar reference characters indicate corresponding parts throughout the several views.

Figure 1 is a transverse section across the machine frame, illustrating one embodiment of the present invention in side elevation, and showing the different positions assumed by the work piece in its transfer between spaced work supporting stations;

Figure 2 is a vertical sectional view taken substantially on the line 2—2 of Figure 1, illustrating the mechanism for rotating the work carrier or transfer device in angularly related paths but in which the carrier is restrained against rotative movement in one of said paths;

Figure 3 is a similar fragmentary sectional view with the mechanism for rotating the work carrier on its support actively functioning and the said restraining means having been released;

Figure 4 is a detail face view showing the assembled relation of certain of the parts;

Figure 5 is a detail view of the cooperating parts for holding or restraining the work carrier against rotation relative to its support, Figure 6 is a fragmentary sectional view taken substantially on the line 6—6 of Figure 5.

Figure 7 is a detail side elevation of one of the parts shown in Figure 5.

Referring in greater detail to the drawings, for the purpose of this explanation, I have shown my improved work manipulating mechanism supported upon a transverse beam 10 suitably fixed at its opposite ends to the side rails 11 of a machine frame. The beam 10 is integrally formed with suitable bearing means 14 in which the tubular shaft 16 surrounding the power driven shaft 18 is journalled. Upon the tubular shaft 16 a control drum partially illustrated at 19 is keyed or otherwise suitably fixed as shown at 20. The shaft 18 at one of its ends has a driving connection with the drum 19, and said drum is provided with cam means controlling the alternate reciprocation of work feeding carriages, as will be more fully understood from reference to my pending application above identified. Since such mechanism constitutes no essential part of the present invention, it is not further illustrated or described herein.

The bearing 14 is formed with an upwardly extending pedestal 24 provided at its upper end with bearing means 26 in which the shaft 28 is journalled at one of its ends, said shaft having the spur gear 30 suitably fixed thereto at one side of the bearing 26 and being restrained against axial movement by the collar 32 fixed to said shaft at the opposite side of the bearing. The pinion 30 is in constant mesh with the teeth of a gear segment 34 journalled upon a stud bolt 36 fixed in the arm 38 formed on one side of the pedestal 24. This segmental gear carries a roller 40 engaged in the cam track or groove 41 formed in the end wall of the control drum 19. The ratio of this gearing is such that gear segment 34 when operated by the control drum 19 oscillates the shaft 28 through somewhat more than 180°, for the purpose to be presently explained.

In laterally spaced relation from the pedestal 24, a sleeve 42 is supported in coaxial relation with the shaft 28 in a fixed part 44 of the machine frame, said sleeve being securely held against rotation in the frame part by means of the pin or key 46. The inner end of said sleeve is integrally formed with a bevel gear segment 48, the teeth of said gear extending through slightly more than 90°, as will be seen from reference to Figure 4 of the drawings. The sleeve 42 has a bearing bushing 50 in which the reduced end portion 52 of a shaft 54 is rotatably supported, said shaft being restrained against axial movement in one direction by the collar 56 suitably fixed in the end of said shaft.

The shaft 54 at the inner end of the portion 52 thereof has an opening 58 extending diametrically therethrough. A work carrier supporting rod or shaft 60 has a portion fitted in the opening 58, said supporting rod being formed with a collar or flange 62 in abutting contact with shaft 54 at one end of said opening. At the opposite side of the shaft 54, the end of the supporting rod or shaft 60 is of reduced diameter, as at 64, and extends through a bushing 66 disposed through an opening in one side of a housing member 68 having abutting contact with the frame part 44 and rotatable as a unit with the shaft 54. The nut 69 threaded upon the end portion 64 of the shaft 60 forces the bushing inwardly into abutting contact with the shaft 54 and together with the collar 62 rigidly secures the rod or shaft 60 in connected relation with the shaft 54 for unitary rotation therewith. If desired, the part of the rod 60 extending through the opening 58 may be of rectangular form in cross-section to further prevent any relative rotation between said rod and the shaft 54.

The other end portion of the shaft 54 is of tubular form and receives the reduced end portion 70 of the shaft 28, said shaft extending loosely through the elongated nut 72 threaded in the end of the tubular shaft section. Within said shaft section, a sleeve 74 is keyed to the reduced end 70 of the shaft 28, as at 76, for rotative movement with and for longitudinal movement with respect to said shaft. A coil spring 78 interposed between one end of said sleeve and the nut 72 urges said sleeve in one direction to normally hold the notches 80 formed in one end of said sleeve in locking engagement with the transverse pin 82 affixed at its ends in the wall of the tubular section of the shaft 54. Thus, under normal operation condition, the shafts 28 and 54 are connected to rotate as a unit but upon overload or excessive resistance to such unitary rotation, the pin 82 has a camming action upon the edges of the notches 80 thus forcing the sleeve 74 inwardly against the resistance of spring 78 whereby the shaft 54 is disconnected from shaft 28, thus permitting of the relative rotation of said shafts.

Upon the supporting rod 60 the sleeve 84 is rotatably mounted, said sleeve at one of its ends being formed with a bevel gear 86 in abutting contact with the collar or flange 62 of said rod. This gear is adapted for meshing contact with the teeth of the segmental gear 48 on the sleeve 42. The rod 60 extends beyond the other end of the sleeve 84 and is threaded to receive the nut 88 holding said sleeve against axial movement on the rod. This end of the sleeve has affixed thereto one jaw member 90 of the work carried or transfer device, the other jaw member 92 thereof being pivoted intermediate of its ends, as at 94, at one side of sleeve 84 and extending therefrom to the opposite side of the sleeve where it is pivotally connected as at 98 to one end of a fluid pressure receiving cylinder 96. A piston 100 in this cylinder has a rod 102 pivotally connected at its upper end, as at 104, to the fixed jaw member 90. The spring 106, interposed between the upper end of said cylinder and the piston 100, normally urges this cylinder upwardly and yieldingly holds the jaw members 90 and 92 in open position. High pressure fluid is supplied to the lower end of the cylinder 96 through the flexible tubing 108 which is suitably connected with a control valve indicated at 110 actuated by cam member 112 on the tubular shaft 16 in properly timed relation with the operation of the work transfer mechanism.

I also provide automatically operating means for holding or restraining the sleeve 84 and the work gripping or carrying means mounted thereon against rotation relative to the supporting rod 60 when the gear element 86 on said sleeve moves out of meshed relation with the teeth of the fixed segmental gear 48. As herein shown, this restraining means comprises a collar 114 positioned between the back face of the gear element 48 and the opposing face of the fixed frame part 44 of the machine. This collar is pinned or keyed to the sleeve 42, as shown at 116, and thus secured in fixed relation to the gear 48. At its outer edge, the collar 114 is formed with the laterally projecting flange 118, said flange being interrupted or cut away as shown at 120 throughout the circumferential portion thereof opposed to and slightly exceeding the extent of the teeth on gear 48.

Upon the sleeve 84, adjacent the gear 86 and within an opening in one side of the housing 68, a cooperating collar 122 is keyed or otherwise fixed to said gear as at 124 to rotate as a unit therewith. This collar at one side thereof is formed with a flat camming surface 126 which is adapted to frictionally coact with the edge face of the flange 118 on collar 114 so that in the continued movement of the rod 60 with sleeve 84 and the work carrier, in the rotation of shaft 54 after the gear 86 is disengaged from the teeth of the segmental gear 48, said sleeve and the work carrier will be locked or restrained against rotative movement upon the supporting rod 60.

Referring now to Figure 1 of the drawings, the work receiving and supporting stations are substantially equidistantly spaced from opposite sides of a vertical plane which includes the axis of the shaft 28. As herein shown, one of these work supports comprises a horizontal bar 128 having a concave upper seating surface for the work piece, while the other of said supports comprises two spaced cylindrical rods 130. However, it will be understood that these work supports may be of various other structural forms.

From the foregoing description, it will be seen that upon rotation of the control drum 19, by reason of the predetermined form of the cam track 41, oscillatory rotation will be transmitted to shaft 28 by gears 34 and 30 through an arc of slightly more than 180°. However, insofar as the essential features of the present invention are concerned, various other means may be employed for transmitting oscillatory rotation to the shaft 28 from the power driven shaft 18. Assuming that a work piece, indicated at W on the work support 128, has been gripped and held between the jaws 90 and 92 of the work carrier, during the initial portion of the bodily rotative movement of the support 60 and the work carrier with the shaft 54, the cam face 126 of collar 122 is in engagement with the edge face of the flange 118 on the collar 114 as shown in Figure 2, so that the sleeve 84 and the work carrier are held against rotative movement about the axis of the support from the position shown in Figure 1. In the continued movement of the work carrier and its support in the direction indicated by the arrow, the gear 86 on the inner end of sleeve 84 is brought into mesh with the teeth of segmental gear 48 while the collar 122 moves out of frictional contact with flange 118 and into the recess or cutaway portion 120 of said flange, thus permitting of the rotation of the sleeve 84 and the work carrier about the axis of the support 60. The work carrier is thereby rotated in a path at right angles to the path of movement of said carrier with the support 60. This functionally coacting relation of the gear elements 48 and 86 is shown in Figure 3 of the drawings and continues until the work carrier has been rotated on the support 60 through approximately 180°, at which time the work piece W will be completely reversed from the position which it formerly occupied on the support 128. The work piece is thus positioned in contact upon the support 130 substantially at the end of the clock-wise oscillation of shaft 28 and support 60 and while the gear 86 and 48 remain in engagement. Valve 110 is then actuated to release pressure fluid from cylinder 96, so that spring 106 acts to release the jaws 90 and 92 of the work carrier from gripping contact with the work piece. The oscillatory rotation of the shaft 28 is then reversed and the work carrier returned to its former position to receive another work piece from the support 128. In the initial movement of the work carrier in the counter-clockwise direction it is rotated by gears 48 and 60 to the position seen in Figure 1. Thereafter cam surface 126 on collar 122 engages flange 118 as above described to hold said carrier against rotation on the support so that at the end of movement of said support the work gripping jaws will be properly positioned to engage the work piece on support 128. It will thus be seen that the movement of the work carrier through angularly related paths in properly timed relation is precisely and accurately controlled through the medium of a single power operated oscillating shaft.

I have referred to a particular type of work carrier or transfer device and operating means therefor to hold and release the work piece, which has been found particularly desirable for use in connection with the machine disclosed in my pending application above identified. However, the mechanism herein disclosed may obviously also be advantageously employed for the operation and control of work carriers or transfer devices of various other structural forms, in the manner above described, as may be found most desirable for use in connection with the particular process of manufacture performed by the machine to which my improved work manipulating or transfer mechanism is applied.

From the foregoing description and the accompanying drawings, it will be appreciated that I have provided a very simple mechanism for transferring and accurately manipulating a work piece between spaced work receiving stations. The operating and control unit for the support 60 and the work carrier mounted thereon, as shown in Figures 2 and 3 of the drawings, comprises a very compact organization of cooperatively associated mechanical parts which will function in a positive and reliable manner to precisely control and limit the degree or extent of movement of the work carrier and work piece through angularly related paths. The provision of means whereby this compound rotative movement of the work carrier is effected in response to the oscillatory motion of the single power operated shaft 54 greatly simplifies the construction of such transfer mechanisms as heretofore employed in the art. By the elimination of separate racks and actuating cams for moving the work carrier in the individual angularly related paths, I have effected a very material reduction in the production costs of such transfer mechanisms, in addition to obtaining greater accuracy and efficiency in the practical operation thereof.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In work transfer mechanism, a fixed support, a horizontal shaft rotatably journalled in said support, a housing directly supported by and surrounding said shaft at one side of said fixed support for oscillation about the shaft axis, a work carrier shaft extending radially from said housing and rotatably mounted at one of its ends therein, a supporting member for the work carrier shaft extending diametrically through said housing and horizontal shaft and rigidly fixed thereto, work holding means on the other end of the carrier shaft, a power operated shaft drivingly coupled with said horizontal shaft for imparting oscillating motion to said housing and work carrier, a gear on said work carrier shaft and a gear segment fixed to said support in mesh with said gear and enclosed within said housing for rotating said work carrier shaft in the oscillating motion thereof.

2. In work transfer mechanism, a fixed support, a horizontal shaft rotatably journalled in said support, a housing directly supported by and connected with said shaft at one side of said fixed support for oscillation as a unit with the shaft about the axis thereof, a work carrier shaft extending radially from said housing and rotatably journalled at one of its ends therein, work holding means on the other end of the carrier shaft, a power operated shaft for imparting oscillating motion to said housing and work carrier shaft, a gear on said work carrier shaft, a gear segment fixed to said support in mesh with said gear and enclosed within said housing for rotating said work carrier shaft in the oscillating motion thereof, and a releasable driving connection between said shaft and said power operated shaft, responsive to overload on the work carrier shaft.

3. In work transfer mechanism, a shaft, means journalling said shaft at one end for oscillatory motion about a horizontal axis, work carrying means oscillatable with said shaft including a supporting member extending diametrically through said shaft intermediate of its ends and rigidly fixed thereto, power driven means including a shaft disposed in axially telescoped relation with the other end of the first named shaft, and coupling means between said shafts comprising a spring-biased coupling member rotatable with one of said shafts and coacting with a complementary coupling member fixed to the other shaft and operative upon overload on the work carrier to release the driving connection between said shafts.

4. In work transfer mechanism, a shaft, means journalling said shaft at one end for oscillatory motion about a horizontal axis, work carrying means oscillatable with said shaft including a supporting member extending diametrically through said shaft intermediate of its ends and rigidly fixed thereto, a work carrier sleeve mounted to rotate on said supporting member and having a gear at one end thereof, a gear segment in fixed coaxial relation to the journalled end of said shaft coacting with said gear to impart rotating movement to the work carrier sleeve on said support during a predetermined portion of its oscillatory motion in each direction, and power driven operating means for said shaft operatively connected with the other end thereof.

5. In work transfer mechanism, a shaft, means journalling said shaft at one end for oscillatory motion about a horizontal axis, work carrying means oscillatable with said shaft including a supporting member extending diametrically through said shaft intermediate of its ends and rigidly fixed thereto, a work carrier sleeve mounted to rotate on said supporting member and having a gear at one end thereof, a gear segment in fixed coaxial relation to the journalled end of said shaft coacting with said gear to impart rotating movement to the work carrier sleeve on said support during a predetermined portion of its oscillatory motion in each direction, power driven operating means for said shaft operatively connected with the other end thereof, and a housing structure enclosing the intersecting parts of the shaft and supporting member and said gearing and rigidly connected to said supporting member.

6. In work transfer mechanism, a fixed support, a shaft journalled at one end in said support, a housing abutting one side of said support and having bearing means for said shaft spaced from said support, a work carrier assembly including a member extending diametrically through said shaft between said bearing means and fixed support and means securing said member in rigidly fixed relation to said shaft and housing, a work holder rotatably mounted on said member, means for oscillating said shaft, housing and work carrier assembly about the axis of said shaft, and means for rotating the work holder relative to said member during a definitely limited portion of the oscillating traverse of said assembly.

NEVIN B. SMITH.

REFERENCES CITED

The following references are of record in the file of this patent:

UNITED STATES PATENTS

| Number | Name | Date |
|---|---|---|
| 1,786,608 | Halstead | Dec. 30, 1930 |
| 1,811,832 | Mayers | June 23, 1931 |
| 1,947,610 | McNamara | Feb. 20, 1934 |
| 2,048,331 | Geist | July 21, 1936 |
| 2,061,085 | Price | Nov. 17, 1936 |
| 2,224,975 | McNamara | Dec. 17, 1940 |
| 2,334,174 | Clausen | Nov. 16, 1943 |
| 2,415,997 | Eldred | Feb. 18, 1947 |